United States Patent
Russell et al.

(10) Patent No.: US 12,001,418 B2
(45) Date of Patent: Jun. 4, 2024

(54) ONBOARDING A DATA SOURCE FOR ACCESS VIA A VIRTUAL ASSISTANT

(71) Applicant: ZEBRA TECHNOLOGIES CORPORATION, Lincolnshire, IL (US)

(72) Inventors: Dale W. Russell, Palatine, IL (US); Jeffrey B. Wilhite, Barrington, IL (US); Valik Solorzano Barboza, Glenview, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 118 days.

(21) Appl. No.: 17/463,425

(22) Filed: Aug. 31, 2021

(65) Prior Publication Data

US 2023/0069640 A1 Mar. 2, 2023

(51) Int. Cl.
| | |
|---|---|
| *G06F 16/23* | (2019.01) |
| *G06F 16/2457* | (2019.01) |
| *G06F 16/2458* | (2019.01) |
| *G06F 16/248* | (2019.01) |
| *G06F 18/21* | (2023.01) |
| *G06N 20/00* | (2019.01) |

(52) U.S. Cl.
CPC .... *G06F 16/2358* (2019.01); *G06F 16/24573* (2019.01); *G06F 16/2471* (2019.01); *G06F 16/248* (2019.01); *G06F 18/217* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 2017/0242860 A1* | 8/2017 | Souche | G06F 16/2455 |
| 2018/0091401 A1 | 3/2018 | Richards et al. | |
| 2018/0121508 A1* | 5/2018 | Halstvedt | G06F 16/24545 |
| 2019/0095478 A1 | 3/2019 | Tankersley et al. | |
| 2019/0325084 A1 | 10/2019 | Peng et al. | |
| 2020/0068031 A1* | 2/2020 | Kursun | H04W 24/02 |
| 2020/0073895 A1* | 3/2020 | Vira | G06F 16/906 |
| 2020/0302336 A1* | 9/2020 | Frost | G06N 20/00 |
| 2022/0351722 A1* | 11/2022 | Mandry | G06F 40/20 |

OTHER PUBLICATIONS

International Search Report and Written Opinion for International Application No. PCT/US2022/38679 dated Feb. 2, 2023.

\* cited by examiner

*Primary Examiner* — Dawaune A Conyers

(57) ABSTRACT

In some implementations, a query management system may receive an access notification associated with the data source. The query management system may analyze the data source to determine a query parameter that is associated with the data source. The query management system may determine a reliability score for the query parameter based on at least one of: source data of the data source, and other source data associated with one or more other data sources. The query management system may configure, based on the reliability score satisfying a reliability threshold, a communication interface with the data source. The query management system may integrate the data source for use with the virtual assistant in accordance with the reliability score, the query parameter, and the communication interface.

18 Claims, 7 Drawing Sheets

ONBOARDING A DATA SOURCE FOR ACCESS VIA A VIRTUAL ASSISTANT

BACKGROUND

A virtual assistant may be installed on user device to assist a user of the user device to perform one or more operations and/or provide information in response to a command from the user. Types of assistance and/or information that is to be provided to a user and/or an organization that utilizes a virtual assistant may evolve over time. Furthermore, the types of assistance and/or information may become relatively unique or specific to an individual user or an individual organization over time. Accordingly, to adequately provide the desired assistance or information to a user or organization, there is a need for the virtual assistant to be able to adapt to utilize additional data sources and/or identify a most reliable data source that can be used to provide the desired assistance and/or information.

SUMMARY

Some implementations described herein relate to a method for integrating a data source for access via a virtual assistant. The method may include receiving, by a query management system of a virtual assistant, an access notification associated with the data source. The method may include analyzing, by the query management system, the data source to determine a query parameter that is associated with the data source. The method may include determining, by the query management system, a reliability score for the query parameter based on at least one of, source data of the data source, and other source data associated with one or more other data sources. The method may include configuring, by the query management system and based on the reliability score satisfying a reliability threshold, a communication interface with the data source. The method may include integrating, by the query management system, the data source for use with the virtual assistant in accordance with the reliability score, the query parameter, and the communication interface.

Some implementations described herein relate to a device. The device may include one or more memories and one or more processors coupled to the one or more memories. The one or more processors may be configured to receive an access notification associated with a data source. The one or more processors may be configured to identify a query parameter that is associated with the data source. The one or more processors may be configured to determine a reliability score for the query parameter based on at least one of. The one or more processors may be configured to integrate, based on the reliability score satisfying a reliability threshold, the data source for use with a virtual assistant in accordance with the reliability score and the query parameter.

Some implementations described herein relate to a non-transitory computer-readable medium that stores a set of instructions for a device. The set of instructions, when executed by one or more processors of the device, may cause the device to configure, based on a protocol of a data source, a communication interface with the data source. The set of instructions, when executed by one or more processors of the device, may cause the device to analyze source information associated with the data source to determine a query parameter that is associated with the data source. The set of instructions, when executed by one or more processors of the device, may cause the device to determine, using a machine learning model, a reliability score associated with the data source and the query parameter. The set of instructions, when executed by one or more processors of the device, may cause the device to integrate, based on the reliability score satisfying a reliability threshold, the data source with a virtual assistant to cause the virtual assistant to use the communication interface to access the data source for queries involving the query parameter.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations of concepts disclosed herein, and explain various principles and advantages of those implementations.

Figure 1:
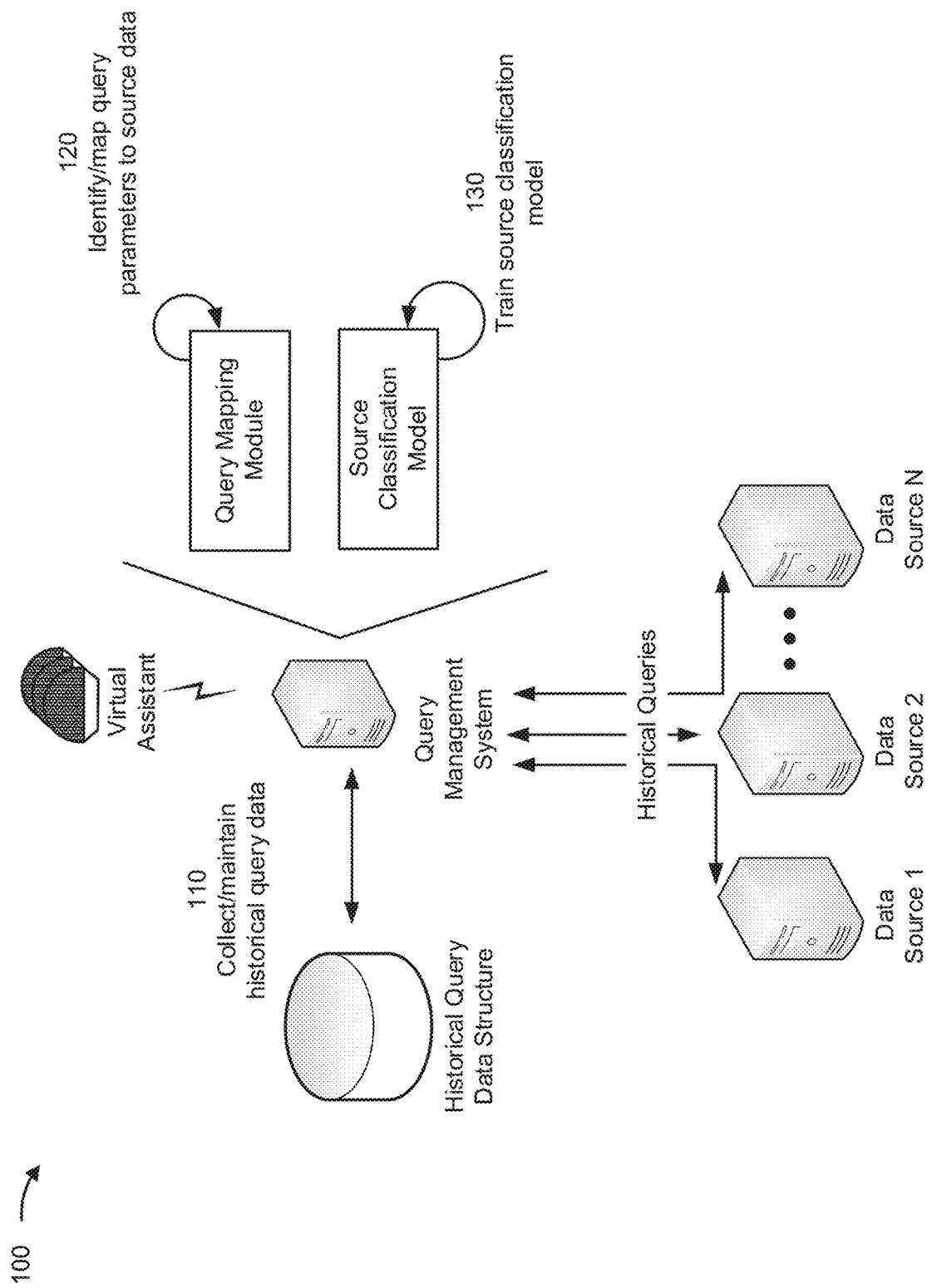
FIG. 1 is a diagram of an example implementation associated with a configuration of a query management system described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations described herein.

The apparatus and method elements have been represented where appropriate by conventional symbols in the drawings, showing only those specific details that are pertinent to understanding the implementations described herein so as not to obscure the disclosure with details that will be readily apparent to those of ordinary skill in the art having the benefit of the description herein.

DETAILED DESCRIPTION

The following detailed description of example implementations refers to the accompanying drawings. The same reference numbers in different drawings may identify the same or similar elements.

A user device may include a virtual assistant that assists a user of the user device to use the user device to perform an operation. For example, the user may request the virtual assistant to set a calendar event on a calendar associated with the user device, adjust a volume level of the user device, control media playback, and/or initiate a communication session via the user device. In some cases, the user may request the virtual assistant to perform a search based on a query. The virtual assistant may utilize natural language processing to process the query and identify parameters of the query. Based on the identified parameters, the virtual assistant can search one or more data sources for information related to the parameters of the query.

However, information (and/or data) in some data sources can become outdated (e.g., because the data sources have not been updated or are incapable of receiving updated information). For example, information associated with some individual data sources can be updated relatively frequently, while information associated with other data sources may be updated less frequently or not updated at all. Similarly, new data sources may become available with more accurate or up-to-date information, relative to other previously existing data sources. Accordingly, there is a need for a system that is capable of determining which data sources are up-to-date and/or are likely most reliable with respect to providing accurate information associated with a particular query parameter.

Typically, data sources that are accessible to a virtual assistant are publicly available data sources (e.g., data sources that have been made available through the Internet and/or open-source data structures). In some cases, a user may want the virtual assistant to assist the user and/or perform operations involving a data source that is not publicly available and/or that is not configured to be queried by a virtual assistant. Such a data source may be a private data source, such as a data source that stores private or confidential information associated with the user and/or an entity associated with the user (e.g., an employer of the user, such as an enterprise or other type of organization). In such cases, unless the virtual assistant has access to the data source, the virtual assistant may be unable to process a query involving a request for information from the data source to identify corresponding query parameters, and/or the virtual assistant may be unable respond to the query with the requested information. Accordingly, there is a need for a system that is capable of onboarding a data source for use with a virtual assistant.

Some implementations described herein enable a query management system to onboard a data source for use with a virtual assistant and determine a reliability of the data source, relative to other available data sources. The query management system may determine the reliability based on an analysis of the data source that indicates that the data source includes information associated with certain query parameters. Accordingly, the query management system may determine the reliability of the data source with respect to having accurate information or data that is associated with the query parameters.

Furthermore, the query management system, as described herein, may process a query received from a virtual assistant that involves one or more of the query parameters, select the data source for use with the virtual assistant according to the reliability, and obtain and/or provide information from the data source according to the reliability. The query management system may automatically onboard the data source according to one or more communication interfaces and/or protocol information associated with the data source. In some implementations, the query management system, as described herein, may dynamically update a ranking of data sources with respect to providing accurate information associated with certain queries. For example, the query management system may re-rank the data sources according to updated reliability scores associated with the data sources. The updated reliability scores may be determined periodically, according to a schedule, based on feedback from a user, and/or based on feedback from the virtual assistant.

In this way, the query management system may automatically onboard a data source in a manner that permits a virtual assistant to quickly and efficiently obtain information from the data source. For example, based on a determined reliability of the data source with respect to a query parameter, the query management system may quickly and efficiently process a query involving the query parameter to provide accurate information associated with the query. More specifically, based on the query management system determining that a particular data source is most reliable or most likely to have the most accurate or up-to-date information associated with a query parameter, the query management system may obtain the information from that data source without querying or processing information from other data sources (e.g., because the other data sources likely have less accurate or outdated information). In this way, the query management system may conserve computing resources (e.g., processor resources and/or memory resources) and/or communication resources that would otherwise be wasted by a system that individually queries multiple databases for a single query of a virtual assistant.

FIGS. 1-4 are diagrams of one or more example implementations associated with a virtual assistant, a query management system, and/or one or more data source, as described herein. As described herein, the query management system may receive a command from the virtual assistant. The query management system may interpret the command (e.g., using natural language processing) to identify query parameters corresponding to the command and generate a query based on the query parameters. The query parameters may be indicative of a desired type of assistance that is to be provided to a user of the virtual assistant. For example, the query parameters may correspond to one or more types of information or operations that are to be included within a response to a query and/or a response to a command of the virtual assistant.

Furthermore, as described herein, the query management system may send the query to a data source (e.g., to prompt the data source to respond with source information associated with the query parameters). The query management system may receive source information provided by the data source based on the query and forward a response to the virtual assistant that is associated with the source information.

FIG. 1 is a diagram of an example implementation 100 associated with a configuration of a query management system described herein. As shown in FIG. 1, example implementation 100 includes a query management system that is associated with one or more virtual assistants, a historical query data structure, and N data sources (Data Source 1 through Data Source N, N>1). In example implementation 100, a source classification model of the query management system may be trained to determine a reliability of a data source according to identified and/or processed queries of the query management system, as described elsewhere herein.

As shown in FIG. 1, and by reference number 110, the query management system collects and/or maintains historical query data. The historical query data may be associated with historical queries from one or more of the virtual assistants. For example, the historical queries may correspond to queries that were generated from historical commands received from the virtual assistants (from historical uses of the virtual assistant by one or more users). The historical queries may be received during a training period that is associated with collecting training data to train the source classification model, as elsewhere described herein.

For one or more of the historical queries, the historical query data may include the historical query (e.g., a search string determined from a command received from the virtual assistant), the command received from the virtual assistant that is associated with the virtual assistant, which of the data sources were queried using the query, which data source was used in generating a response to the command of the virtual assistant, and what response was sent to the virtual assistant.

In some implementations, the historical query data may include feedback associated with the response. The feedback may be received from the virtual assistant and/or a user associated with the virtual assistant that indicates whether the response was accurately provided. In some implementations, the feedback may include an indication that the response was inaccurate. For example, the user may explicitly state that the response is inaccurate. In some implementations, the feedback may be interpreted and/or inferred from an additional command. For example, if an additional command is received that is similar to a previously provided command, the query management system may interpret the additional command as feedback that indicates that the response to the query was inaccurate (e.g., because the user may reword a command because the previous response was inaccurate). In this way, the feedback of the historical query data may indicate whether information in a certain response to a query was an accurate response to a command from a virtual assistant and/or whether information in a certain response was an inaccurate response to a command from the virtual assistant. Furthermore, the historical query data may indicate which data sources provide accurate responses to the historical queries and which data sources provided inaccurate responses to the historical queries.

The query management system may maintain and/or store the collected historical query data in the historical query data structure. The query management system may use any suitable technique to process, sort, organize, and/or store the collected historical query data for training the source classification model, as described herein.

As further shown in FIG. 1, and by reference number 120, the query management system identifies and/or maps query parameters to source information associated with the data sources. For example, the query management system may use a query mapping module to analyze the historical query data to identify features of the historical query data that are associated with query parameters of the historical queries. The query mapping module may analyze the historical query data to determine whether certain data sources provided accurate responses with respect to certain query parameters. The query identification model may determine, from the historical query data and using a pattern recognition technique, that certain queries involving certain query parameters caused a data source to provide relatively more accurate responses to commands from the virtual assistants than one or more of the other data sources. In such cases, the query mapping module may identify and/or store a feature of the historical query data that indicates that query parameters are associated with the data source.

Accordingly, the query mapping module may determine, indicate, and/or store (e.g., within the historical query data structure or other type of data structure) a feature that indicates that a first data source is more likely to provide an accurate response to a certain query than a second data source. Correspondingly, the query mapping module may determine, indicate, and/or store a feature that the first data source likely has more accurate information associated with a certain query parameter of the query than the second data source. In this way, the query mapping module may identify and/or extract features from the historical query data that are indicative of which of the data sources are more reliable than other data sources with respect to certain query parameters.

As further shown in FIG. 1, and by reference number 130, the query management system trains a source classification model. For example, the query management system may train the source classification model based on the identified features of the historical query data that are identified by the query mapping module. More specifically, the query management system trains the source classification model to identify which of the data sources are more reliable, with respect to providing information associated with certain query parameters, than other data sources.

The source classification model may include and/or be associated with a machine learning model. The machine learning model may be trained based on the historical query data and/or the features using one or more machine learning algorithms, such as a regression algorithm, a decision tree algorithm, a random-forest algorithm, a neural network algorithm, a k-nearest neighbor algorithm, a support vector machine algorithm, or the like. In some implementations, the source classification model may be trained to identify patterns and/or trends associated with responses to queries from a data source being accurate or inaccurate. In such a case, the source classification model may identify characteristics (e.g., certain commands, certain types of commands, certain query parameters and/or certain types of query parameters, and/or the like) of queries (or commands) that are likely to enable the data source to provide an accurate response or an inaccurate response.

In some implementations, the query management system may receive the source classification model from another system after the source classification model is trained. For example, the other system may obtain the historical query data to train the source classification model and provide the trained source classification model to query management system to permit the query management system to utilize the source classification model, as described herein. Additionally, or alternatively, the query management system may provide the source classification model to the virtual assistant to permit the virtual assistant to locally utilize the source classification model as described herein. In such a case, the query management system may train one or more machine learning models described herein and provide one or more of the trained machine learning models to the virtual assistant for local use.

In this way, once trained, the query management system may utilize the source classification model to determine a reliability score for a data source, that indicates the data source's ability to accurately provide information associated with a particular query parameter.

Figure 2:
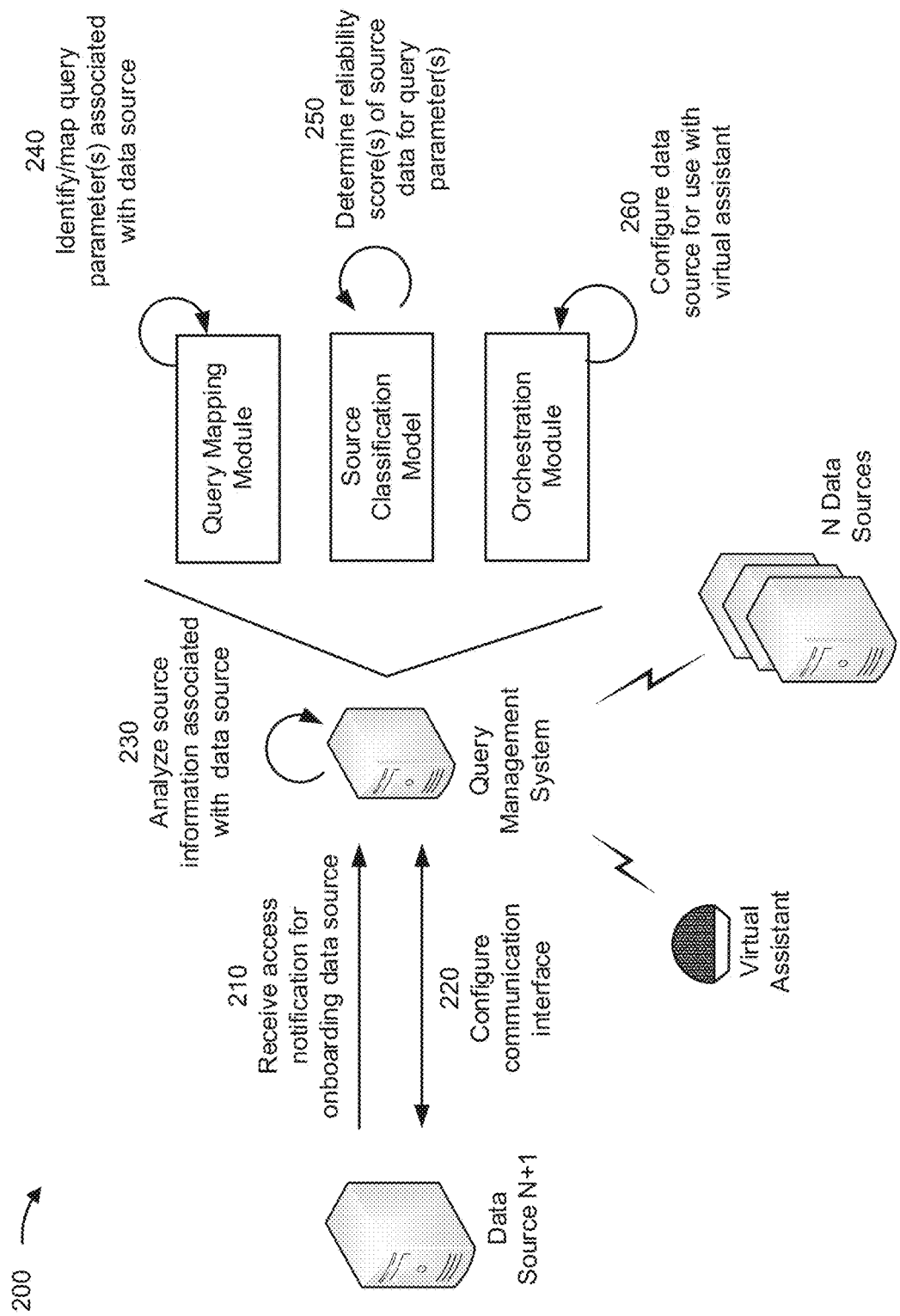
FIG. 2 is a diagram of an example implementation associated with a data source of a query management system described herein.

FIG. 2 is a diagram of an example implementation 200 associated with a data source of a query management system. As shown in FIG. 2, example implementation 200 includes a query management system that is associated with a virtual assistant, a historical query data structure, and N+1 data sources (Data Source 1 through Data Source N+1, N>1). In example implementation 200, the query management system utilizes an orchestration module and the trained source classification model to onboard a data source (Data Source N+1) for use with a virtual assistant.

As shown in FIG. 2, and by reference number 210, the query management system receives an access notification for onboarding the data source. For example, the query management system may receive a request from the data source to be utilized in association with the virtual assistant. Additionally, or alternatively, the access notification may be received in association with a request from a user and/or an entity associated with the data source to configure the data source for use with the virtual assistant. The data source may be a new data source that is to be integrated with the virtual assistant, as described herein. The data source may be a publicly available data source (e.g., a data source that is accessible by other query management systems and/or other virtual assistants that are not associated with the query management system). Additionally, or alternatively, the data source may be associated with a certain enterprise that is configured to provide a service in association with the virtual assistant. Such an enterprise may serve as an information source (e.g., a news organization or media outlet that supplies news or information to virtual assistants), a product provider (e.g., a retailer that indicates product availability via a virtual assistant), a navigation system (e.g., an organization that provides traffic or route information to a virtual assistant), among other examples.

In some implementations, the data source may be a private data source associated with the user and/or the entity. Accordingly, the data source may include information that is inaccessible to other query management systems and/or other virtual assistant devices that are not associated with the query management system. Furthermore, the data source may include information that is not included with any of the other data sources. Correspondingly, as described herein, the data source may be considered as a more reliable source with respect to query parameters that involve that type of information. As an example, the data source may be associated with an inventory management system of an organization. In such a case, the data source may indicate characteristics associated with an inventory of the organization, such a quantity of items of the inventory, a location of items of the inventory, a transportation schedule associated with items of the inventory, supply information associated with items of the inventory, customer information associated with items of the inventory, or the like. Accordingly, integration and configuration of the data source with the query management system and/or the virtual assistant, as described elsewhere herein, may permit a user of the virtual assistant to obtain information associated with the inventory management system using the query management system and/or the virtual assistant.

As further shown in FIG. 2, and by reference number 220, the query management system and/or the data source may configure a communication interface with the data source. The query management system and/or the data source may be configured to set up the communication interface using any suitable communication protocols and/or techniques. For example, the query management system may process protocol information associated with the data source to identify a protocol associated with querying the data source. The query management system may configure the communication interface with the data source according to the protocol. For example, if the data source uses or is associated with an application programming interface (API), the query management system may configure the communication interface to enable the query management system to access the API in order to send a query to the data source, and/or access information associated with the data source (e.g., access raw data, metadata, a description of the data source, or any other type of source information).

As further shown in FIG. 2, and by reference number 230, the query management system may analyze source information associated with the data source. For example, the query management system may obtain the source information from the data source and/or via the communication interface. The query management system may analyze the data source in association with one or more query parameters and/or queries. For example, the query management system may analyze raw data of the data source that is associated with values for responses associated with the query parameters and/or responses to the queries. The query management system may process metadata associated with the data source. For example, the metadata may be based on a data structure of the data source. The metadata may identify that the data source is configured to process types of information within the data structure. Accordingly, from the metadata, the query management system may identify a query parameter that is associated with one or more of the types of information (e.g., a parameter that is identified by the query mapping module as described above).

In some implementations, the query management system may process, using a natural language processing technique, a description of the data source that indicates that the data source is associated with the query parameter. For example, the description may be received within the access notification and/or a response to a request for the description from the query management system. The description may correspond to one or more annotations associated with a configuration of the data source and/or a configuration of a data structure of the data source.

In some implementations, the query management system may analyze source data of the data source. The source data may include raw data that is maintained by the data source within a data structure of the data source, types of data identified within the data structure, and/or configuration data associated with the data structure.

In this way, the query management system may analyze the data source to determine whether the data source is associated with one or more query parameters, such as one or more of the query parameters that were identified by the query mapping module, as described elsewhere herein. The query management system may be configured to analyze the source information of the data source relative in association with individual query parameters. Accordingly, the query management system may analyze the source information and/or the data source to discover or learn whether the data source is associated with a query parameter that is associated with another data source (e.g., a data source that the query management system determined to be a relatively reliable source of information associated with the query parameter).

As further shown in FIG. 2, and by reference number 240, the query management system may map a query parameter associated with the data source. For example, the query management system, using the query mapping module as described above, may indicate that the data source may provide information that is associated with a query parameter (and/or perform an operation that is associated with the query parameter). In some implementations, if the query management system determines that the data source is not associated with a query parameter (e.g., a query parameter learned by or known to the query mapping module), the query management system may request the data source to indicate the query parameter and/or the query management system may configure the query management module to monitor and/or analyze future queries to the data source to permit the query management module to learn and/or identify query parameters that are associated with the data source.

As further shown in FIG. 2, and by reference number 250, the query management system may determine a reliability score of the source data for the query parameter. The reliability score may be indicative of an ability of the data source to respond to a query involving the query parameter (e.g., an ability of the data source to accurately respond with a level of accuracy that is relative to one or more other data sources).

The query management system, via the source classification model, may determine the reliability score based on the source data associated with the data source. For example, reliability score associated with a query parameter and determined for a data source as described herein, may be indicative of whether the data source has or is storing information that is associated with the query parameter, may be indicative of how accurate or up-to-date the information associated with the query parameter that the data source contains, may be indicative of a quantity of information associated with the query parameter that the data source contains, and so on.

As described herein, the source classification model (or a machine learning model of the source classification model) may be trained based on historical data (e.g., historical query data) that is associated with using the one or more other data sources (Data Source 1 through Data Source N) to provide a response to a query associated with the query parameter. The query management system may determine the reliability score based on other source data that is associated with the other data scores (e.g., Data Source 1 through Data Source N). Accordingly, the reliability score may be determined relative to reliability scores of the other data scores.

As further shown in FIG. 2, and by reference number 260, the query management system may configure the data source for use with the virtual assistant. To configure the data source for use with the virtual assistant, the query management system may configure the communication interface to enable communication between the data source and the virtual assistant. Additionally, or alternatively, query management system may designate the data source for use in association with a particular query parameter, based on a reliability score associated with the query parameter and the data source determined by the source classification model. In some implementations, the query management system may integrate the data source with the virtual assistant to cause the virtual assistant to use the communication interface to access the data source for queries involving the query parameter. For example, the query management system may configure the virtual assistant to access the data source via the communication interface and a protocol associated with the data source.

In some implementations, the query management system may determine that the data source is to be configured for use with the virtual assistant based on the reliability score satisfying a reliability threshold. The reliability threshold may be a fixed threshold (e.g., a fixed score associated with a scale of reliability scores associated with the source classification model). Additionally, or alternatively, the reliability threshold may be based on individual reliability scores associated with the one or more other data sources and/or a desired number of data sources that are to be queried in association with a particular query parameter. For example, if a high reliability score indicates that a data source is a most reliable source of information associated with a query parameter and the query management system is to query only the data source that is determined to be the most reliable, the reliability threshold may be a second highest reliability score that is associated with one of the other data sources. As another example, if the query management system to query a top three data sources that are determined to be most reliable, the reliability threshold may be the fourth highest reliability score.

In this way, the query management system may onboard the data source by integrating the data source for use with the virtual assistant in accordance with the reliability score, the query parameter, and/or the communication interface.

Figure 3:
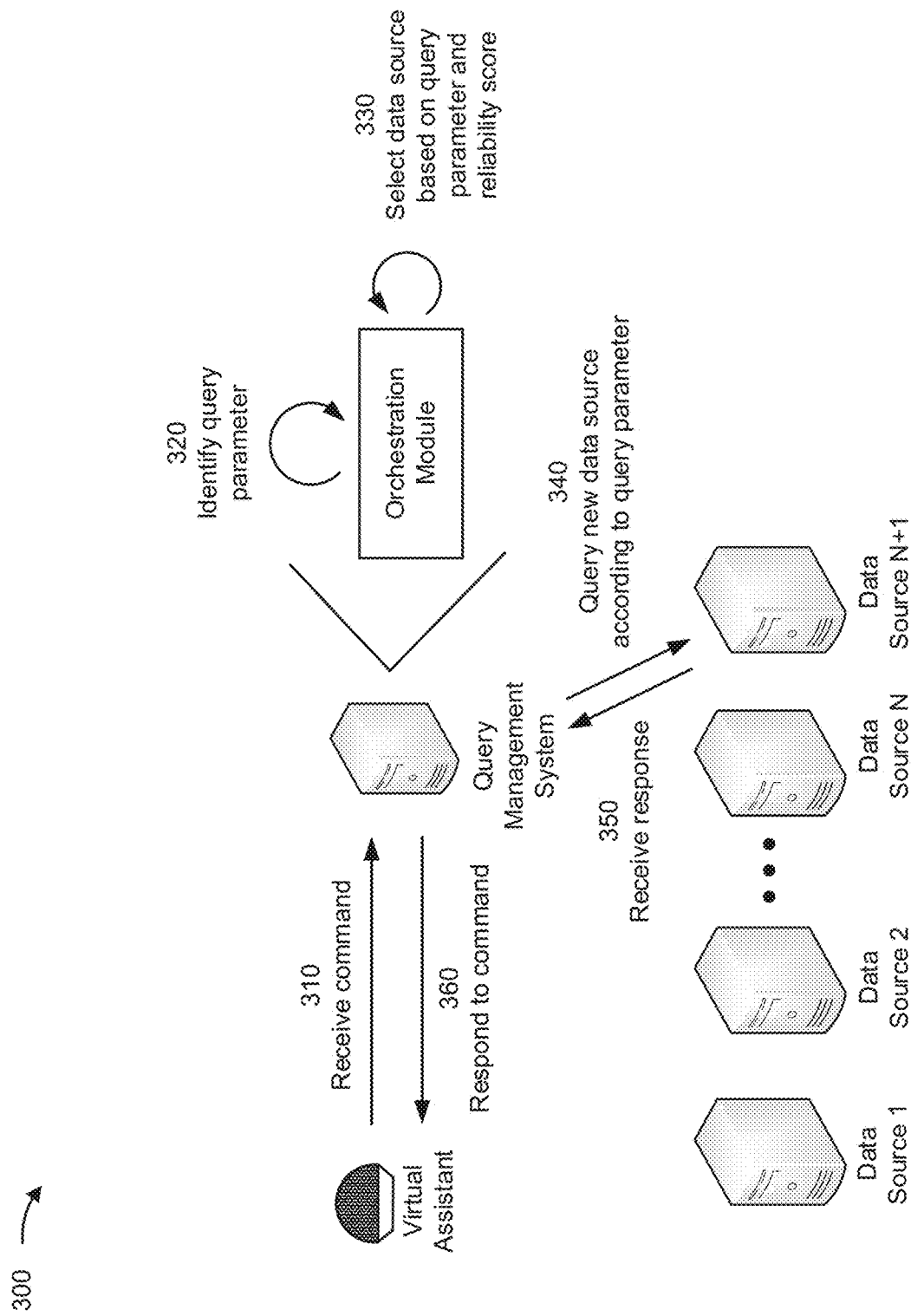
FIG. 3 is a diagram of an example implementation associated with a query management system, described herein, in association with a virtual assistant, as described herein.

FIG. 3 is a diagram of an example implementation 300 associated with a query management system, described herein, in association with a virtual assistant, as described herein. As shown in FIG. 3, example implementation 300 includes a query management system, a virtual assistant, a historical query data structure, and N+1 data sources (Data Source 1 through Data Source N+1, N>1). In example implementation 300, the query management system processes a query from the virtual assistant using a newly onboarded data source (Data Source N+1) and according reliability scores associated with the N+1 data sources.

As shown in FIG. 3, and by reference number 310, the query management system receives a command from the virtual assistant. The command may be received in any suitable form or manner. For example, the command may be received via a communication link between the virtual assistant and the query management system. The command may be received as a phrase and/or text. In some implementations, the query management system may perform one or more preprocessing techniques (e.g., one or more filtering techniques, a voice processing or recognition technique, and/or a speech-to-text technique, among other examples) on the command to determine a query parameter as described herein.

As further shown in FIG. 3, and by reference number 320, the query management system identifies a query parameter. For example, the query management system may identify a query parameter associated with the command and/or that is interpreted from the command. The query management system may process the command (e.g., using natural language processing) to identify one or more query parameters associated with the command (e.g., to determine desired information or assistance requested in the command).

As further shown in FIG. 3, and by reference number 330, the query management system selects a data source based on the query parameter and a reliability score. For example, the query management system may select Data Source N+1 to be queried based on the reliability score indicating that Data Source N+1 is a most reliable source of information associated with the query parameter (and/or most reliable source to perform an operation associated with the query parameter). Accordingly, the query management system may select, based on the reliability score satisfying a reliability threshold (e.g., a threshold indicating that the data source is one of the most reliable data sources), the recently onboarded data source over one or more of the other data sources, to provide a response to the query.

As further shown in FIG. 3, and by reference number 340, the query management system queries the data source according to the query parameter. For example, based on selecting Data Source N+1 (and/or a reliability score associated Data Source N+1 and the query parameter), the query management system may send the query with the query parameter to Data Source N+1 to cause the data source to provide a response to the command. The query management system may cause Data Source N+1 to respond to the command directly to the virtual assistant (e.g., via a configured communication link between the virtual assistant and Data Source N+1).

Additionally, or alternatively, the query management system may cause Data Source N+1 to provide a response to the query management system to permit the query management system to forward the response to the virtual assistant. In some implementations, prior to sending the query, the query management system may convert the query to a protocol associated with the data source and/or generate the query according to a protocol of the data source. For example, the query may be configured in a particular format, query language, or other specific protocol characteristic that is associated with a protocol used by the data source. Accordingly, the query management system may convert the query from a first protocol associated with the virtual assistant to a second protocol that is associated with the data source to form a converted query. The query management system may send the converted query to the data source to cause the data source to provide a response associated with the query parameter (which may correspond to a response to the command from the virtual assistant).

As further shown in FIG. 3, and by reference number 350, the query management system receives a response from the data source. The query management system may process the response prior to sending the response to the virtual assistant. For example, the query management system may convert the response from a protocol associated with the data source to a protocol associated with the virtual assistant.

As further shown in FIG. 3, and by reference number 360, the query management system responds to the command. For example, the query management system may send or forward the response from the data source to the virtual assistant.

In some implementations, the query management system may perform one or more actions after sending the response. For example, the query management system may monitor the virtual assistant for feedback and/or request the virtual assistant to provide feedback associated with the query. In this way, the query management system may verify whether the response was accurately provided or was not accurately provided. Additionally, or alternatively, the query management system may retrain and/or update the source classification model and/or the query mapping module.

Figure 4:
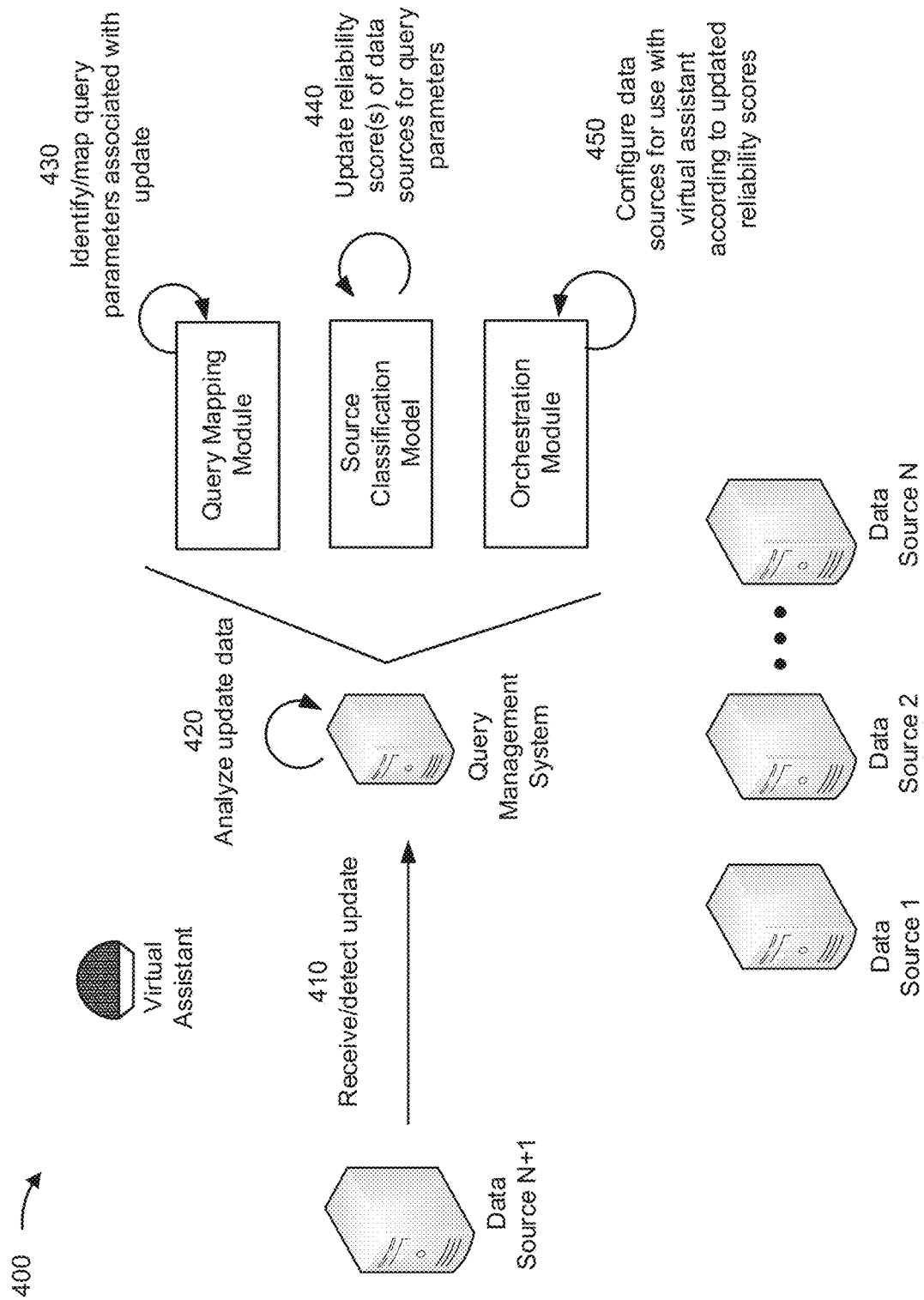
FIG. 4 is a diagram of an example implementation associated with an update to a data source of a query management system described herein.

FIG. 4 is a diagram of an example implementation 400 associated with an update to a data source of a query management system. As shown in FIG. 4, example implementation 400 includes a query management system, a virtual assistant, a historical query data structure, and N+1 data sources (Data Source 1 through Data Source N+1, N>1). In example implementation 400, the query management system updates reliability scores associated with the N+1 data sources based on an update to one of the data sources (Data Source N+1).

As shown in FIG. 4, and by reference number 410, the query management system receives and/or detects an update to a data source. For example, the query management system may be configured to monitor one or more of the data sources. As shown, the query management system may detect an update to Data Source N+1. The update may be associated with source information associated with the data source. For example, the update may include an update to the raw data stored by the source information, an update to metadata associated with the data source, an update to a data structure associated with the data source (e.g., a format or architecture of the data structure) and so on.

The query management system may monitor the one or more data sources for updates to determine whether a ranking of the data sources should be adjusted for one or more query parameters. For example, an update to a data source that is considered to be relatively less reliable may be determined to be more reliable based on the update (e.g., based on information or data associated with the data source being more up-to-date, based on the data source receiving additional information or data, and so on).

As further shown in FIG. 4, and by reference number 420, the query management system analyzes update data associated with the update. For example, the query management system may analyze one or more characteristics of update data associated with the update to identify data and/or information associated with Data Source N+1 that was updated or changed according to the update.

The query management system, using the query mapping module and/or the source classification model, may analyze the update data to determine whether to adjust the reliability scores, as described herein. For example, based on Data Source N+1 and one or more of the other data sources being associated with a query parameter associated that is associated with a characteristic of the update data, the query management system may determine that the reliability score is to be adjusted according to the update. Additionally, or alternatively, the query management system may analyze a quantity of the update data, types of data or information in the update data, whether the update data includes new types of data and/or new information that previously was not available in Data Source N+1 or another one of the data sources, among other examples.

As further shown in FIG. 4, and by reference number 430, the query management system identifies and/or maps query parameters associated with the update. For example, based on determining that the ranking is to be adjusted, the query management system may use the query mapping module to identify query parameters associated with the update. In example implementation 400, the query management system may determine from a characteristic of the update that the data source is associated with another (or an additional) query parameter with which Data Source N+1 was not previously associated (e.g., based on Data Source N+1 receiving data associated with the other query parameter). Accordingly, the query mapping module may map Data Source N+1 to the query parameter of the update.

As further shown in FIG. 4, and by reference number 440, the source classification model updates reliability scores of the data sources for the query parameters. For example, the source classification model may adjust the reliability score for one or more of the data sources in association with the one or more data sources being used to provide a response to a query, as described elsewhere herein.

In this way, the query management system may dynamically update, using the source classification model, a reliability score based on detecting updates to one or more of the data sources (e.g., the data source that is updated and/or the other data sources).

As further shown in FIG. 4, and by reference number 450, the source classification model configures the data sources for use with the virtual assistant according to the updated reliability scores. For example, in example implementation 400, the query management system may designate Data Source N+1 for use in association with a query from the virtual assistant that involves a query parameter identified in the update.

As indicated above, FIGS. 1-4 are provided as examples. Other examples may differ from what is described with regard to FIGS. 1-4. The number and arrangement of devices shown in FIGS. 1-4 are provided as an example. In practice, there may be additional devices, fewer devices, different devices, or differently arranged devices than those shown in FIGS. 1-4. Furthermore, two or more devices shown in FIGS. 1-4 may be implemented within a single device, or a single device shown in FIGS. 1-4 may be implemented as multiple, distributed devices. Additionally, or alternatively, a set of devices (e.g., one or more devices) shown in FIGS. 1-4 may perform one or more functions described as being performed by another set of devices shown in FIGS. 1-4.

Figure 5:
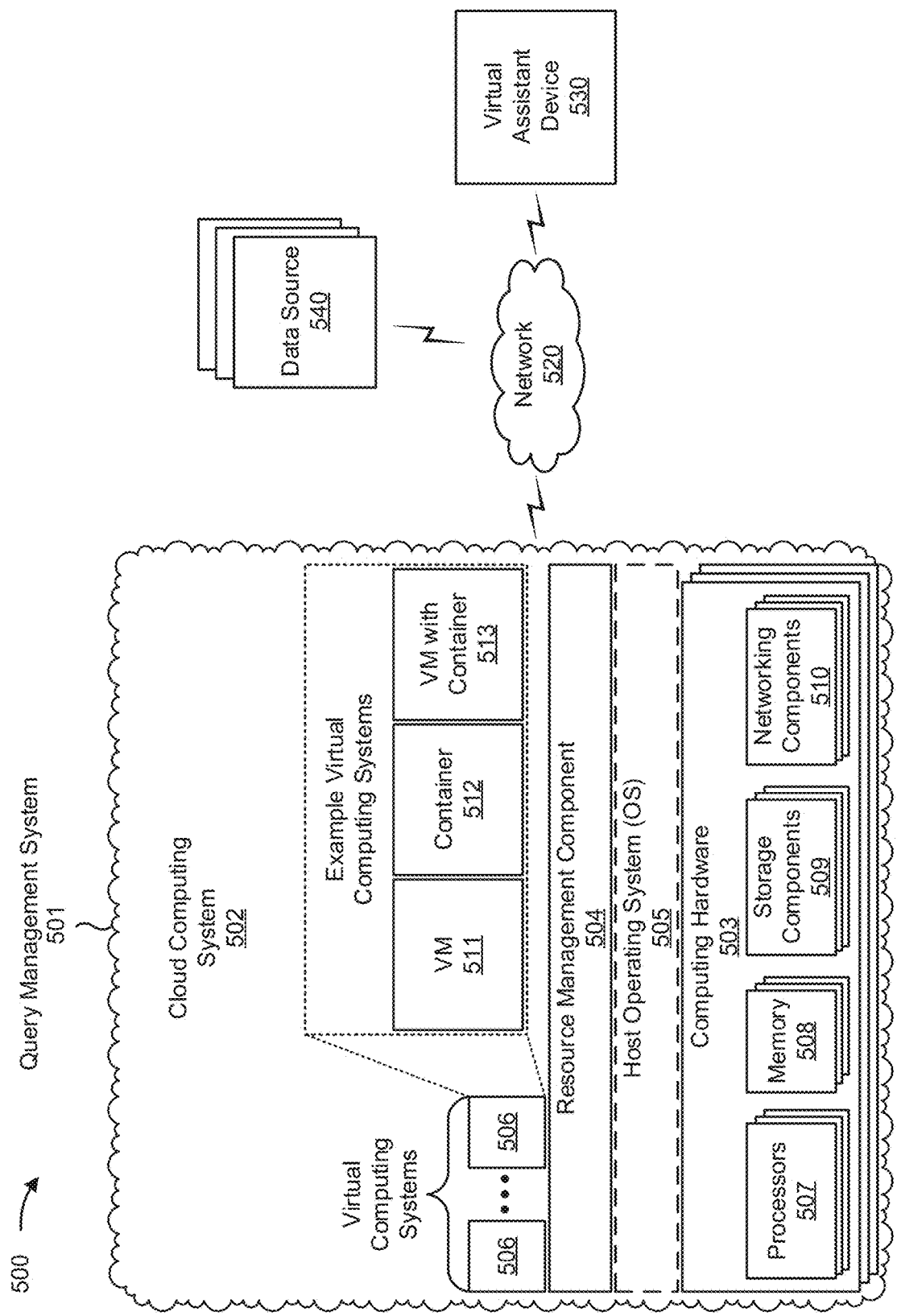
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a query management system 501, which may include one or more elements of and/or may execute within a cloud computing system 502. The cloud computing system 502 may include one or more elements 503-513, as described in more detail below. As further shown in FIG. 5, environment 500 may include a network 520, a virtual assistant device 530, and a data source 540. Devices and/or elements of environment 500 may interconnect via wired connections and/or wireless connections.

The cloud computing system 502 includes computing hardware 503, a resource management component 504, a host operating system (OS) 505, and/or one or more virtual computing systems 506. The cloud computing system 502 may execute on, for example, an Amazon Web Services platform, a Microsoft Azure platform, or a Snowflake platform. The resource management component 504 may perform virtualization (e.g., abstraction) of computing hardware 503 to create the one or more virtual computing systems 506. Using virtualization, the resource management component 504 enables a single computing device (e.g., a computer or a server) to operate like multiple computing devices, such as by creating multiple isolated virtual computing systems 506 from computing hardware 503 of the single computing device. In this way, computing hardware 503 can operate more efficiently, with lower power consumption, higher reliability, higher availability, higher utilization, greater flexibility, and lower cost than using separate computing devices.

Computing hardware 503 includes hardware and corresponding resources from one or more computing devices. For example, computing hardware 503 may include hardware from a single computing device (e.g., a single server) or from multiple computing devices (e.g., multiple servers), such as multiple computing devices in one or more data centers. As shown, computing hardware 503 may include one or more processors 507, one or more memories 508, one or more storage components 509, and/or one or more networking components 510. Examples of a processor, a memory, a storage component, and a networking component (e.g., a communication component) are described elsewhere herein.

The resource management component 504 includes a virtualization application (e.g., executing on hardware, such as computing hardware 503) capable of virtualizing computing hardware 503 to start, stop, and/or manage one or more virtual computing systems 506. For example, the resource management component 504 may include a hypervisor (e.g., a bare-metal or Type 1 hypervisor, a hosted or Type 2 hypervisor, or another type of hypervisor) or a virtual machine monitor, such as when the virtual computing systems 506 are virtual machines 511. Additionally, or alternatively, the resource management component 504 may include a container manager, such as when the virtual computing systems 506 are containers 512. In some implementations, the resource management component 504 executes within and/or in coordination with a host operating system 505.

A virtual computing system 506 includes a virtual environment that enables cloud-based execution of operations and/or processes described herein using computing hardware 503. As shown, a virtual computing system 506 may include a virtual machine 511, a container 512, or a hybrid environment 513 that includes a virtual machine and a container, among other examples. A virtual computing system 506 may execute one or more applications using a file system that includes binary files, software libraries, and/or other resources required to execute applications on a guest operating system (e.g., within the virtual computing system 506) or the host operating system 505.

Although the query management system 501 may include one or more elements 503-513 of the cloud computing system 502, may execute within the cloud computing system 502, and/or may be hosted within the cloud computing system 502, in some implementations, the query management system 501 may not be cloud-based (e.g., may be implemented outside of a cloud computing system) or may be partially cloud-based. For example, the query management system 501 may include one or more devices that are not part of the cloud computing system 502, such as device 600 of FIG. 6, which may include a standalone server or another type of computing device. The query management system 501 may perform one or more operations and/or processes described elsewhere herein. In some implementations, the query management system 501 may configure the user device 530 to perform one or more operations and/or processes described elsewhere herein (e.g., one or more processes or operations associated with the source classification model that are enabled by providing the source classification model to the user device 530).

Network 520 includes one or more wired and/or wireless networks. For example, network 520 may include a cellular network, a public land mobile network (PLMN), a local area network (LAN), a wide area network (WAN), a private network, the Internet, and/or a combination of these or other types of networks. The network 520 enables communication among the devices of environment 500.

The user device 530 includes one or more devices capable of receiving, generating, storing, processing, and/or providing information associated with a virtual assistant, as described elsewhere herein. The user device 530 may include a communication device and/or a computing device. For example, the user device 530 may include a wireless communication device, a mobile phone, a user equipment, a laptop computer, a tablet computer, a desktop computer, a gaming console, a smart appliance, a home assistant device, a wearable communication device (e.g., a smart wristwatch, a pair of smart eyeglasses, a head mounted display, or a virtual reality headset), or a similar type of device.

The data source 540 includes one or more devices capable of receiving, generating, storing, processing, and/or providing information that can be queried by the query management system 501 and/or utilized in association with a virtual assistant of the virtual assistant device 530, as described elsewhere herein. The data source 540 may include a communication device and/or a computing device. For example, the data source 540 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 540 may communicate with one or more other devices of environment 500, as described elsewhere herein.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
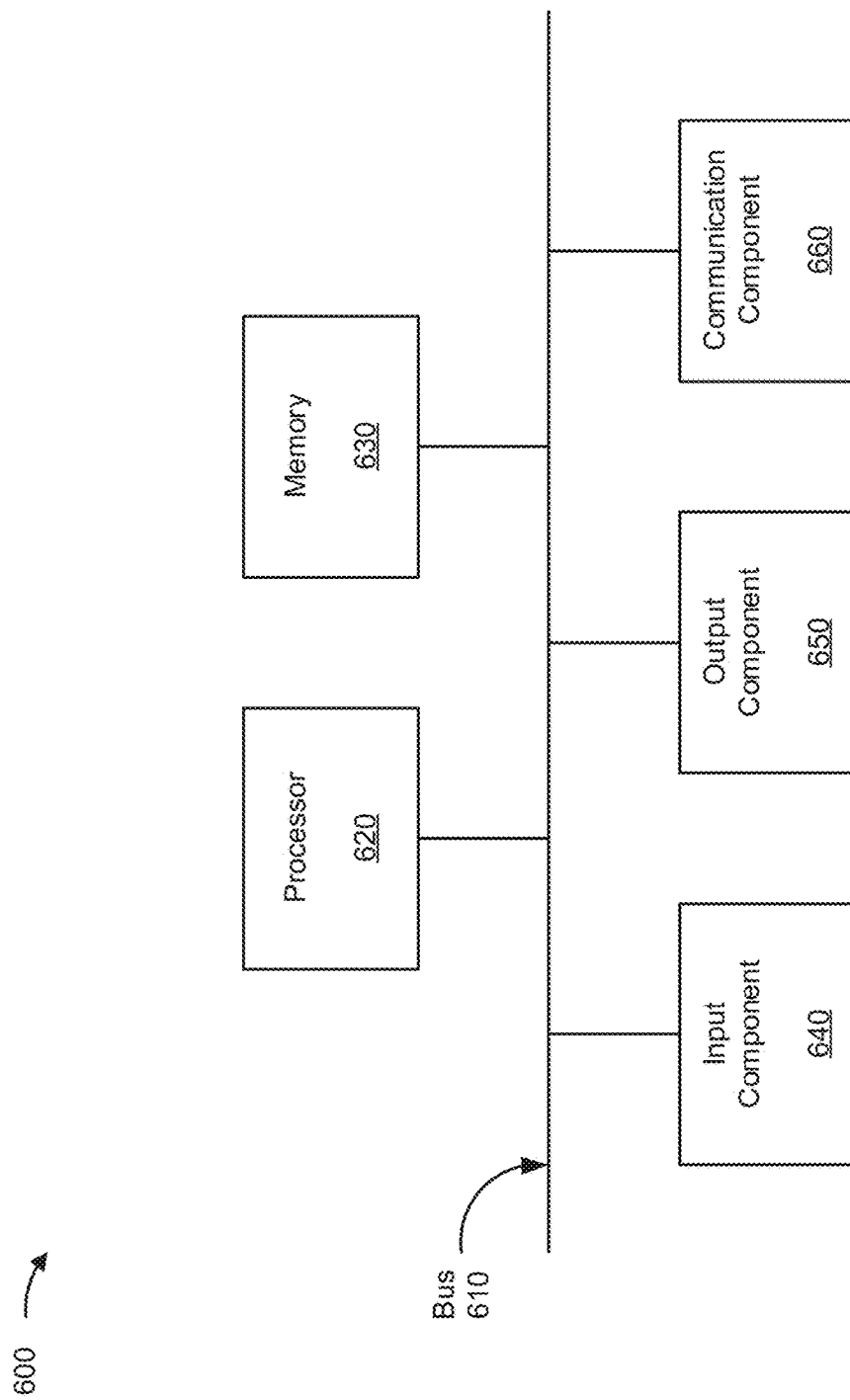
FIG. 6 is a diagram of example components of one or more devices of FIG. 5.

FIG. 6 is a diagram of example components of a device 600, which may correspond to the query management system 501, the virtual assistant device 530, and/or the data source 540. In some implementations, the query management system 501, the virtual assistant device 530, and/or the data source 540 may include one or more devices 600 and/or one or more components of device 600. As shown in FIG. 6, device 600 may include a bus 610, a processor 620, a memory 630, an input component 640, an output component 650, and a communication component 660.

Bus 610 includes one or more components that enable wired and/or wireless communication among the components of device 600. Bus 610 may couple together two or more components of FIG. 6, such as via operative coupling, communicative coupling, electronic coupling, and/or electric coupling. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware, firmware, or a combination of hardware and software. In some implementations, processor 620 includes one or more processors capable of being programmed to perform one or more operations or processes described elsewhere herein.

Memory 630 includes volatile and/or nonvolatile memory. For example, memory 630 may include random access memory (RAM), read only memory (ROM), a hard disk drive, and/or another type of memory (e.g., a flash memory, a magnetic memory, and/or an optical memory). Memory 630 may include internal memory (e.g., RAM, ROM, or a hard disk drive) and/or removable memory (e.g., removable via a universal serial bus connection). Memory 630 may be a non-transitory computer-readable medium. Memory 630 stores information, instructions, and/or software (e.g., one or more software applications) related to the operation of device 600. In some implementations, memory 630 includes one or more memories that are coupled to one or more processors (e.g., processor 620), such as via bus 610.

Input component 640 enables device 600 to receive input, such as user input and/or sensed input. For example, input component 640 may include a touch screen, a keyboard, a keypad, a mouse, a button, a microphone, a switch, a sensor, a global positioning system sensor, an accelerometer, a gyroscope, and/or an actuator. Output component 650 enables device 600 to provide output, such as via a display, a speaker, and/or a light-emitting diode. Communication component 660 enables device 600 to communicate with other devices via a wired connection and/or a wireless connection. For example, communication component 660 may include a receiver, a transmitter, a transceiver, a modem, a network interface card, and/or an antenna.

Device 600 may perform one or more operations or processes described herein. For example, a non-transitory computer-readable medium (e.g., memory 630) may store a set of instructions (e.g., one or more instructions or code) for execution by processor 620. Processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, processor 620 may be configured to perform one or more operations or processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
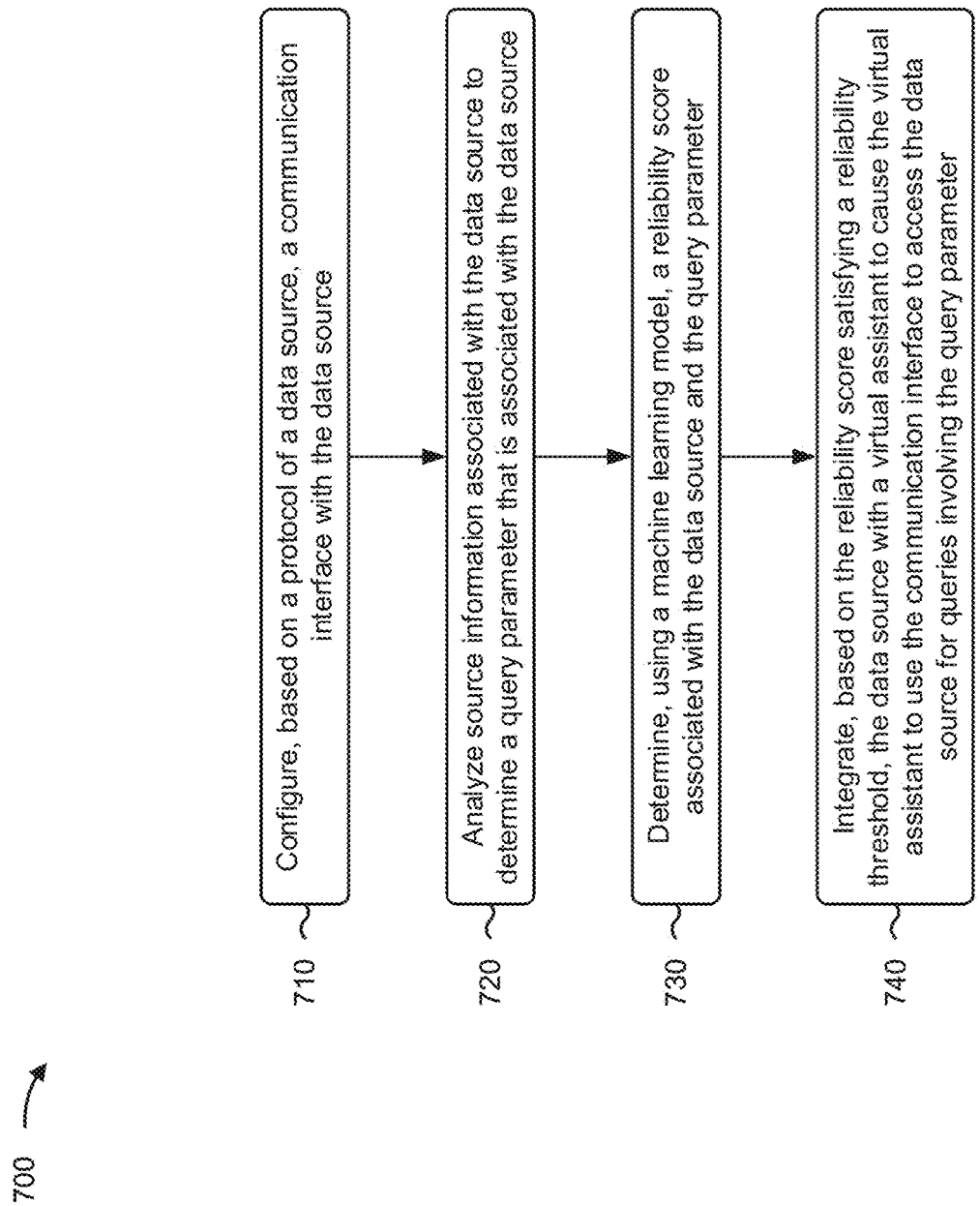
FIG. 7 is a flowchart of an example processes relating to onboarding a data source for access via a virtual assistant.

FIG. 7 is a flowchart of an example process 700 associated with onboarding a data source for access via a virtual assistant. In some implementations, one or more process blocks of FIG. 7 may be performed by a query management system (e.g., the query management system 501). In some implementations, one or more process blocks of FIG. 7 may be performed by another device or a group of devices separate from or including the query management system, such as a virtual assistant device (e.g., the virtual assistant device 530) and/or a data source (e.g., the data source 540). Additionally, or alternatively, one or more process blocks of FIG. 7 may be performed by one or more components of device 600, such as processor 620, memory 630, input component 640, output component 650, and/or communication component 660.

As shown in FIG. 7, process 700 may include configuring, based on a protocol of a data source, a communication interface with the data source (block 710). For example, the query management system may configure, based on a protocol of a data source, a communication interface with the data source, as described above.

As further shown in FIG. 7, process 700 may include analyzing source information associated with the data source to determine a query parameter that is associated with the data source (block 720). For example, the query management system may analyze source information associated with the data source to determine a query parameter that is associated with the data source, as described above.

In some implementations, the source information comprises at least one of raw data that is maintained by the data source, metadata associated with the data source, or a description of the data source.

As further shown in FIG. 7, process 700 may include determining, using a machine learning model, a reliability score associated with the data source and the query parameter (block 730). For example, the query management system may determine, using a machine learning model, a reliability score associated with the data source and the query parameter, as described above. In some implementations, the reliability score is indicative of an ability of the data source to respond to a query involving the query parameter relative to one or more other data sources.

In some implementations, the machine learning model is trained based on historical data that is associated with using the one or more other data sources to provide a response to a query associated with the query parameter. The query management system may dynamically update, using the machine learning model, the reliability score based on detecting updates to the data source or the one or more other data source.

As further shown in FIG. 7, process 700 may include integrating, based on the reliability score satisfying a reliability threshold, the data source with a virtual assistant to cause the virtual assistant to use the communication interface to access the data source for queries involving the query parameter (block 740). For example, the query management system may integrate, based on the reliability score satisfying a reliability threshold, the data source with a virtual assistant to cause the virtual assistant to use the communication interface to access the data source for queries involving the query parameter, as described above.

To integrate the data source with the virtual assistant, the query management system may configure the virtual assistant to access the data source via the communication interface and a protocol associated with the data source. In some implementations, the reliability threshold is based on an individual reliability score associated with the one or more other data sources.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

In the foregoing disclosure, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present disclosure. Additionally, the described embodiments/examples/implementations should not be interpreted as mutually exclusive, and should instead be understood as potentially combinable if such combinations are permissive in any way. In other words, any feature disclosed in any of the aforementioned examples or implementations may be included in any of the other aforementioned examples or implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

As used herein, satisfying a threshold may, depending on the context, refer to a value being greater than the threshold, greater than or equal to the threshold, less than the threshold, less than or equal to the threshold, equal to the threshold, not equal to the threshold, or the like.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, as used herein, relational terms such as first and second, top and bottom, or the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

The terms "a" and "an" are defined as one or more unless explicitly stated otherwise herein. Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

The abstract of the disclosure is provided to allow the reader to quickly ascertain the nature of the technical disclosure. It is submitted with the understanding that it will not be used to interpret or limit the scope or meaning of the claims. In addition, in the foregoing description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A method, comprising:
receiving, by a query management system of a virtual assistant, an access notification from a data source, the access notification being indicative of a request by the data source to be utilized with the virtual assistant;
analyzing, by the query management system, the data source to determine a query parameter associated with the data source;
training, by the query management system, a machine learning model based on historical data to determine a reliability score of a data source, the historical data being associated with using one or more other data sources to provide a response to a query associated with the query parameter and the reliability score being indicative of an ability of the data source to respond to the query associated with the query parameter;
determining, by the query management system utilizing the trained machine learning model, a reliability score for the query parameter associated with the data source based on at least one of:
source data of the data source, and
other source data associated with the one or more other data sources;
configuring, by the query management system and based on the reliability score satisfying a reliability threshold, a communication interface with the data source; and
integrating, by the query management system, the data source for use with the virtual assistant in accordance with the reliability score, the query parameter, and the communication interface.

2. The method of claim 1, further comprising:
processing, from the access notification, protocol information associated with the data source to identify a protocol associated with querying the data source, wherein the communication interface is configured according to the protocol information.

3. The method of claim 1, further comprising:
detecting an update to the data source;
analyzing, in association with another query parameter, a characteristic of the update data associated with the update;
determining, based on a characteristic of the update data, that the data source is associated with the other query parameter; and
designating the data source for use in association with a query from the virtual assistant that involves the other query parameter.

4. The method of claim 1, further comprising:
detecting an update to the data source;
analyzing update data associated with the update to determine whether to adjust the reliability score;
determining, based on a characteristic of update data, that the reliability score is to be adjusted; and
adjusting the reliability score of the data source in association with use of the data source to provide a response to a query from the virtual assistant that involves the query parameter.

5. The method of claim 1, further comprising:
detecting an update associated with another data source, of the one or more other data sources, that is associated with the query parameter;
determining, based on the data source and the other data source being associated with the query parameter, that the reliability score is to be adjusted according to the update; and
adjusting the reliability score of the data source in association with use of the data source to provide a response to a query from the virtual assistant that involves the query parameter.

6. The method of claim 1, further comprising:
receiving, from the virtual assistant, a command associated with the query parameter;
causing, based on the reliability score satisfying a reliability threshold, the data source to provide a response to the command; and
providing, to the virtual assistant, the response.

7. A device, comprising:
one or more memories; and
one or more processors, coupled to the one or more memories, configured to:
receive an access notification from a data source, the access notification being indicative of a request by the data source to be utilized with a virtual assistant;
identify a query parameter associated with the data source;
train a machine learning model based on historical data to determine a reliability score of the data source, the historical data being associated with using one or more other data sources to provide a response to a query associated with the query parameter and the reliability score being indicative of an ability of the data source to respond to the query associated with the query parameter;

determine, by utilizing the trained machine learning model, a reliability score for the query parameter associated with the data source based on at least one of:
source data of the data source, and
other source data associated with the one or more other data sources,
wherein the reliability score is indicative of an ability of the data source to respond to queries involving the query parameter relative to the one or more other data sources; and
integrate, based on the reliability score satisfying a reliability threshold, the data source for use with the virtual assistant in accordance with the reliability score and the query parameter.

8. The device of claim 7, wherein the one or more processors are further configured to:
process, from the access notification, protocol information associated with the data source to identify a protocol associated with querying the data source; and
configure a communication interface according to the protocol information.

9. The device of claim 7, wherein, to identify the query parameter, the one or more processors are configured to at least one of:
analyze raw data of the data source that is associated with values for responses to the queries,
process metadata associated with the data source that identifies that the data source is configured to process the query parameter, or
process, using a natural language processing technique, a description of the data source that indicates that the data source is associated with the query parameter.

10. The device of claim 7, wherein the one or more processors are further configured to:
analyze the data source in association with another query parameter;
determine that the data source is associated with the other query parameter;
determine another reliability score for the other query parameter and the data source; and
designate, based on the other reliability score satisfying another reliability threshold, the data source for use in association with a query from the virtual assistant that involves the other query parameter.

11. The device of claim 7, wherein the one or more processors are further configured to:
monitor the data source and the one or more other data sources for an update associated with the data source or the one or more other data sources;
detect the update; and
adjust the reliability score based on whether the update is associated with the data source or one of the one or more other data sources.

12. The device of claim 7, wherein the one or more processors are further configured to:
receive, from the virtual assistant, a command associated with the query parameter;
select, based on the reliability score satisfying a reliability threshold, the data source, over the one or more other data sources, to provide a response to the query; and
cause the data source to provide a response to the command.

13. The device of claim 12, wherein the one or more processors, to cause the data source to respond to the command, are further configured to:
convert the query from a first protocol associated with the virtual assistant to a second protocol that is associated with the data source to form a converted query; and
send the converted query to the data source.

14. A non-transitory computer-readable medium storing a set of instructions, the set of instructions comprising:
one or more instructions that, when executed by one or more processors of a device, cause the device to:
configure, based on a protocol of a data source, a communication interface with the data source;
analyze source information associated with the data source to determine a query parameter associated with the data source;
train a machine learning model based on historical data to determine a reliability score of a data source, the historical data being associated with using one or more other data sources to provide a response to a query associated with the query parameter;
determine, using the trained machine learning model, a reliability score associated with the data source and the query parameter,
wherein the reliability score is indicative of an ability of the data source to respond to a query associated with the query parameter relative to the one or more other data sources; and
integrate, based on the reliability score satisfying a reliability threshold, the data source with a virtual assistant to cause the virtual assistant to use the communication interface to access the data source for queries involving the query parameter.

15. The non-transitory computer-readable medium of claim 14, wherein the source information comprises at least one of:
raw data that is maintained by the data source,
metadata associated with the data source, or
a description of the data source.

16. The non-transitory computer-readable medium of claim 14, wherein the reliability threshold is based on individual reliability scores associated with the one or more other data sources.

17. The non-transitory computer-readable medium of claim 14, wherein the one or more instructions further cause the device to:
dynamically update, using the machine learning model, the reliability score based on detecting updates to the data source or the one or more other data source.

18. The non-transitory computer-readable medium of claim 14, wherein the one or more instructions that cause the device to integrate the data source with the virtual assistant cause the device to:
configure the virtual assistant to access the data source via the communication interface and a protocol associated with the data source.

* * * * *